(12) United States Patent
Kato

(10) Patent No.: US 9,645,909 B2
(45) Date of Patent: May 9, 2017

(54) OPERATION MANAGEMENT APPARATUS AND OPERATION MANAGEMENT METHOD

(71) Applicant: NEC Corporation, Minato-ku, Tokyo (JP)

(72) Inventor: Kiyoshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/435,799

(22) PCT Filed: Oct. 21, 2013

(86) PCT No.: PCT/JP2013/006197
§ 371 (c)(1),
(2) Date: Apr. 15, 2015

(87) PCT Pub. No.: WO2014/064913
PCT Pub. Date: May 1, 2014

(65) Prior Publication Data
US 2015/0269053 A1 Sep. 24, 2015

(30) Foreign Application Priority Data
Oct. 23, 2012 (JP) .................................. 2012-233992

(51) Int. Cl.
*G06F 9/46* (2006.01)
*G06F 11/34* (2006.01)
(Continued)

(52) U.S. Cl.
CPC ........ *G06F 11/3428* (2013.01); *G06F 9/5083* (2013.01); *G06F 11/3024* (2013.01); *G06F 11/34* (2013.01); *G06F 11/3447* (2013.01)

(58) Field of Classification Search
None
See application file for complete search history.

(56) References Cited

U.S. PATENT DOCUMENTS

| 2009/0216624 A1 | 8/2009 | Kato | |
| 2010/0082321 A1* | 4/2010 | Cherkasova | G06F 11/3447 703/22 |
| 2014/0068343 A1* | 3/2014 | Nakajima | G06F 11/3051 714/39 |

FOREIGN PATENT DOCUMENTS

| CN | 101123609 A | 2/2008 |
| JP | 2003-178040 A | 6/2003 |

(Continued)

OTHER PUBLICATIONS

International Search Report for PCT Application No. PCT/JP2013/006197, mailed on Dec. 10, 2013.
(Continued)

*Primary Examiner* — Sisley Kim

(57) ABSTRACT

An operation management apparatus to improve the accuracy of the estimation of the processing performance needed for the execution environment of the migration-destination, is provides, which is performed in system migration. In an operation management apparatus 100, a correlation model storage unit 112 stores a correlation model indicating a correlation for each pair of one or more metrics in a state of executing a predetermined program in a first processing system. A benchmark performance collection unit 103 collects values of a metric having a correlation with another metric in the correlation model in a state of executing a predetermined benchmark process in the first processing system and a second processing system, respectively. A performance comparison unit 104 calculates and outputs a performance ratio of a metric in the second processing system to the metric in the first processing system, based on the values of the metrics in the state of executing the predetermined benchmark process in the first processing system and the second processing system, respectively.

16 Claims, 15 Drawing Sheets

(51) Int. Cl.
*G06F 9/50* (2006.01)
*G06F 11/30* (2006.01)

(56) References Cited

FOREIGN PATENT DOCUMENTS

| | | | |
|---|---|---|---|
| JP | 2006-11902 | A | 1/2006 |
| JP | 2008-139965 | A | 6/2008 |
| JP | 2008-146313 | A | 6/2008 |
| JP | 2008-171234 | A | 7/2008 |
| JP | 2008-287389 | A | 11/2008 |
| JP | 2009-519520 | A | 5/2009 |
| JP | 2009-123174 | A | 6/2009 |
| JP | 4872944 | A | 9/2009 |
| JP | 4872945 | A | 9/2009 |

OTHER PUBLICATIONS

English translation of written opinion for PCT Application No. PCT/JP2013/006197.
Extended European Search Report for EP Application No. EP13849315.0 dated on Jul. 4, 2016.
Chinese Office Action for CN Application No. 201380055542.2 dated on Aug. 3, 2016 with English Translation.

* cited by examiner

400 SERVER CHARACTERISTIC INFORMATION

| SERVER NAME | MACHINE TYPE | CPU LOAD | DISK LOAD | ... |
|---|---|---|---|---|
| WEB SERVER | R1 | INTERMEDIATE | INTERMEDIATE | ... |
| AP SERVER | R1 | HIGH | INTERMEDIATE | ... |
| DB SERVER | R1 | INTERMEDIATE | HIGH | ... |
| ... | ... | ... | ... | ... |

Fig. 6

924 PERFORMANCE COMPARISON RESULTS

| PROCESSING SYSTEM | USE | PRICE | MACHINE TYPE | METRIC | DIVISION | BENCHMARK PERFORMANCE | PERFORMANCE RATIO |
|---|---|---|---|---|---|---|---|
| MIGRATION-SOURCE | — | — | R1 | CPU | — | 80 | 1.0 |
| | | | | MEM | — | 60 | 1.0 |
| | | | | DISK | — | 50 | 1.0 |
| MIGRATION-DESTINATION PLAN A | LOW LOAD | 20,000 | S1 | CPU | LOW SPEED | 96 | 1.2 |
| | | | | MEM | LOW SPEED | 60 | 1.0 |
| | | | | DISK | INTERMEDIATE SPEED | 60 | 1.2 |
| MIGRATION-DESTINATION PLAN B | STANDARD | 40,000 | S1 | CPU | INTERMEDIATE SPEED | 120 | 1.5 |
| | | | | MEM | INTERMEDIATE SPEED | 72 | 1.2 |
| | | | | DISK | INTERMEDIATE SPEED | 60 | 1.2 |
| MIGRATION-DESTINATION PLAN C | CALCULATION | 60,000 | S2 | CPU | HIGH SPEED | 160 | 2.0 |
| | | | | MEM | HIGH SPEED | 90 | 1.5 |
| | | | | DISK | INTERMEDIATE SPEED | 60 | 1.2 |
| MIGRATION-DESTINATION PLAN D | STORAGE | 80,000 | S1 | CPU | INTERMEDIATE SPEED | 120 | 1.5 |
| | | | | MEM | INTERMEDIATE SPEED | 72 | 1.2 |
| | | | | DISK | HIGH SPEED | 80 | 1.6 |

Fig. 10

| TIME | WEB.CPU | WEB.MEM | WEB.DISK | AP.CPU | ... |
|---|---|---|---|---|---|
| ... | ... | ... | ... | ... | ... |
| 2007/10/05 17:25 | 12 | 80 | ... | 33 | ... |
| 2007/10/05 17:26 | 15 | 79 | ... | 32 | ... |
| 2007/10/05 17:27 | 34 | 51 | ... | 32 | ... |
| 2007/10/05 17:28 | 63 | 51 | ... | 35 | ... |
| 2007/10/05 17:29 | 20 | 81 | ... | 50 | ... |
| 2007/10/05 17:30 | 10 | 78 | ... | 51 | ... |
| 2007/10/05 17:31 | 11 | 79 | ... | 34 | ... |
| ... | ... | ... | ... | ... | ... |
| 2007/11/07 8:30 | 20 | 79 | ... | 90 | ... |

Fig. 11

122 CORRELATION MODEL

| INPUT (X) | OUTPUT (Y) | α | β | ... | WEIGHT |
|---|---|---|---|---|---|
| WEB.CPU | WEB.DISK | 0.8 | 10 | ... | 0.88 |
| AP.CPU | AP.DISK | 0.8 | 10 | ... | 0.83 |
| DB.CPU | DB.DISK | 0.8 | 100 | ... | 0.81 |

Fig. 12

124 PERFORMANCE COMPARISON RESULTS

| TYPE | USE | PRICE | MACHINE TYPE | METRIC | DIVISION | BENCHMARK PERFORMANCE | PERFORMANCE RATIO 1 | PERFORMANCE RATIO 2 |
|---|---|---|---|---|---|---|---|---|
| MIGRATION-SOURCE | — | — | R1 | CPU | — | 80 | 1.0 | 1.0 |
| | | | | DISK | — | 50 | 1.0 | 1.0 |
| MIGRATION-DESTINATION PLAN A | LOW LOAD | 20,000 | S1 | CPU | LOW SPEED | 96 | 1.2 | 1.2 |
| | | | | DISK | INTERMEDIATE SPEED | 60 | 1.2 | 1.2 |
| MIGRATION-DESTINATION PLAN B | STANDARD | 40,000 | S1 | CPU | INTERMEDIATE SPEED | 120 | 1.5 | 1.2 |
| | | | | DISK | INTERMEDIATE SPEED | 60 | 1.2 | 1.2 |
| MIGRATION-DESTINATION PLAN C | CALCULATION | 60,000 | S2 | CPU | HIGH SPEED | 160 | 2.0 | 1.2 |
| | | | | DISK | INTERMEDIATE SPEED | 60 | 1.2 | 1.2 |
| MIGRATION-DESTINATION PLAN D | STORAGE | 80,000 | S1 | CPU | INTERMEDIATE SPEED | 120 | 1.5 | 1.5 |
| | | | | DISK | HIGH SPEED | 80 | 1.6 | 1.5 |

Fig. 14

124 PERFORMANCE COMPARISON RESULTS

| TYPE | USE | PRICE | MACHINE TYPE | METRIC | DIVISION | BENCHMARK PERFORMANCE | PERFORMANCE RATIO 1 | PERFORMANCE RATIO 2 | PERFORMANCE RATIO 3 |
|---|---|---|---|---|---|---|---|---|---|
| MIGRATION-SOURCE | — | — | R1 | CPU | — | 80 | 1.0 | 1.0 | 1.0 |
| | | | | DISK | — | 50 | 1.0 | 1.0 | 0.8 |
| MIGRATION-DESTINATION PLAN A | LOW LOAD | 20,000 | S1 | CPU | LOW SPEED | 96 | 1.2 | 1.2 | 1.2 |
| | | | | DISK | INTERMEDIATE SPEED | 60 | 1.2 | 1.2 | 0.96 |
| MIGRATION-DESTINATION PLAN B | STANDARD | 40,000 | S1 | CPU | INTERMEDIATE SPEED | 120 | 1.5 | 1.2 | 1.5 |
| | | | | DISK | INTERMEDIATE SPEED | 60 | 1.2 | 1.2 | 1.2 |
| MIGRATION-DESTINATION PLAN C | CALCULATION | 60,000 | S2 | CPU | HIGH SPEED | 160 | 2.0 | 1.2 | 1.5 |
| | | | | DISK | INTERMEDIATE SPEED | 60 | 1.2 | 1.2 | 1.2 |
| MIGRATION-DESTINATION PLAN D | STORAGE | 80,000 | S1 | CPU | INTERMEDIATE SPEED | 120 | 1.5 | 1.5 | 1.5 |
| | | | | DISK | HIGH SPEED | 80 | 1.6 | 1.5 | 1.2 |

OPERATION MANAGEMENT APPARATUS AND OPERATION MANAGEMENT METHOD

This application is a National Stage Entry of PCT/JP2013/006197 filed on Oct. 21, 2013, which claims priority from Japanese Patent Application 2012-233992 filed on Oct. 23, 2012, the contents of all of which are incorporated herein by reference, in their entirety.

TECHNICAL FIELD

The present invention relates to an operation management apparatus and an operation management method.

BACKGROUND ART

Along with technological advancement in virtual machine execution environment and cloud computing, there has been a need for an operation in which a system that has been fixedly installed is migrated to another execution environment according to changes in external environment, such as occurrence of a disaster or a sharp change in load. For the migration, it is demanded to improve the service level while restraining the cost of the migration by accurately estimating the processing performance needed for the execution environment of the migration-destination and deploying computer resources appropriate for the execution environment of the migration-destination.

As a technology for dealing with such a situation, there is known a technology that, by executing a benchmark process in a plurality of execution environments, calculates performance differences between the execution environments, and, according to the performance differences, estimates a performance needed for the execution environment of a migration-destination.

For example, PTL 1 discloses a performance evaluation assistance system that executes a benchmark program in a standby server and a new server and that measures amounts of usage of resources, such as CPUs (Central Processing Units), storage devices, networks, and the like.

Incidentally, as a related technology, PTL 2 discloses a method that estimates in real time processing load of a system that actually operates in order to perform accounting according to amount of usage of software. PTL 3 discloses an information processing apparatus that simulates software processing load for every functional block and that, using benchmark information as well, estimates a performance for every functional block. PTL 4 discloses an index value calculation apparatus that calculates performance requirements that vary for individual servers according to characteristics of servers that operate, such as usage thereof. PTL 5 and PTL 6 disclose an operation management apparatus that generates a performance model (correlation model) on the basis of a correlation between pieces of performance information collected from systems in which business services operate.

CITATION LIST

Patent Literature

[PTL 1] Japanese Patent Application Laid-Open Publication No. 2008-146313
[PTL 2] Japanese Patent Application Laid-Open Publication No. 2009-519520
[PTL 3] Japanese Patent Application Laid-Open Publication No. 2008-139965
[PTL 4] Japanese Patent Application Laid-Open Publication No. 2008-287389
[PTL 5] Japanese Patent Publication No. 4872944
[PTL 6] Japanese Patent Publication No. 4872945

SUMMARY OF INVENTION

Technical Problem

A performance evaluation assistance system as in PTL 1 described above acquires benchmark performances uniformly with respect to items of performance values determined beforehand, and therefore has a problem of being unable to perform evaluation pursuant to the characteristics of a system (service) to which migration is conducted and being low in the accuracy of performance estimation.

An object of the present invention is to provide an operation management apparatus and an operation management method that can solve the above-stated problem and can improve the accuracy of the estimation of the processing performance needed for the execution environment of the migration-destination, which is performed in system migration.

Solution to Problem

An operation management apparatus according to an exemplary aspect of the invention includes: a correlation model storage means for storing a correlation model indicating a correlation for each pair of one or more metrics in a state of executing a predetermined program in a first processing system; a benchmark performance collection means for collecting values of a metric having a correlation with another metric in the correlation model in a state of executing a predetermined benchmark process in the first processing system and a second processing system, respectively; and a performance comparison means for calculating and outputting a performance ratio of a metric in the second processing system to the metric in the first processing system, based on the values of the metrics in the state of executing the predetermined benchmark process in the first processing system and the second processing system, respectively.

An operation management method according to an exemplary aspect of the invention includes: storing a correlation model indicating a correlation for each pair of one or more metrics in a state of executing a predetermined program in a first processing system; collecting values of a metric having a correlation with another metric in the correlation model in a state of executing a predetermined benchmark process in the first processing system and a second processing system, respectively; and calculating and outputting a performance ratio of a metric in the second processing system to the metric in the first processing system, based on the values of the metrics in the state of executing the predetermined benchmark process in the first processing system and the second processing system, respectively.

A computer readable storage medium according to an exemplary aspect of the invention records thereon a program, causing a computer to perform a method comprising: storing a correlation model indicating a correlation for each pair of one or more metrics in a state of executing a predetermined program in a first processing system; collecting values of a metric having a correlation with another metric in the correlation model in a state of executing a predetermined benchmark process in the first processing system and a second processing system, respectively; and calculating and outputting a performance ratio of a metric in the second processing system to the metric in the first processing system, based on the values of the metrics in the state of executing the predetermined benchmark process in the first processing system and the second processing system, respectively.

Advantageous Effects of Invention

An advantageous effect of the present invention is to be able to improve the accuracy of the estimation of the processing performance needed for the execution environment of the migration-destination, which is performed in system migration.

BRIEF DESCRIPTION OF DRAWINGS

FIG. 6 is a diagram illustrating performance comparison results 924 in an operation management system underlying the present invention.

FIG. 10 is a diagram illustrating an example of performance information in the first exemplary embodiment of the present invention.

FIG. 11 is a diagram illustrating an example of a correlation model 122 in the first exemplary embodiment of the present invention.

FIG. 12 is a diagram illustrating performance comparison results 124 in the first exemplary embodiment of the present invention.

FIG. 14 is a diagram illustrating performance comparison results 124 in a second exemplary embodiment of the present invention.

DESCRIPTION OF EMBODIMENTS (Underlying Management System)

First, a configuration of an operation management apparatus 900 underlying the present invention will be described.

Figure 4:
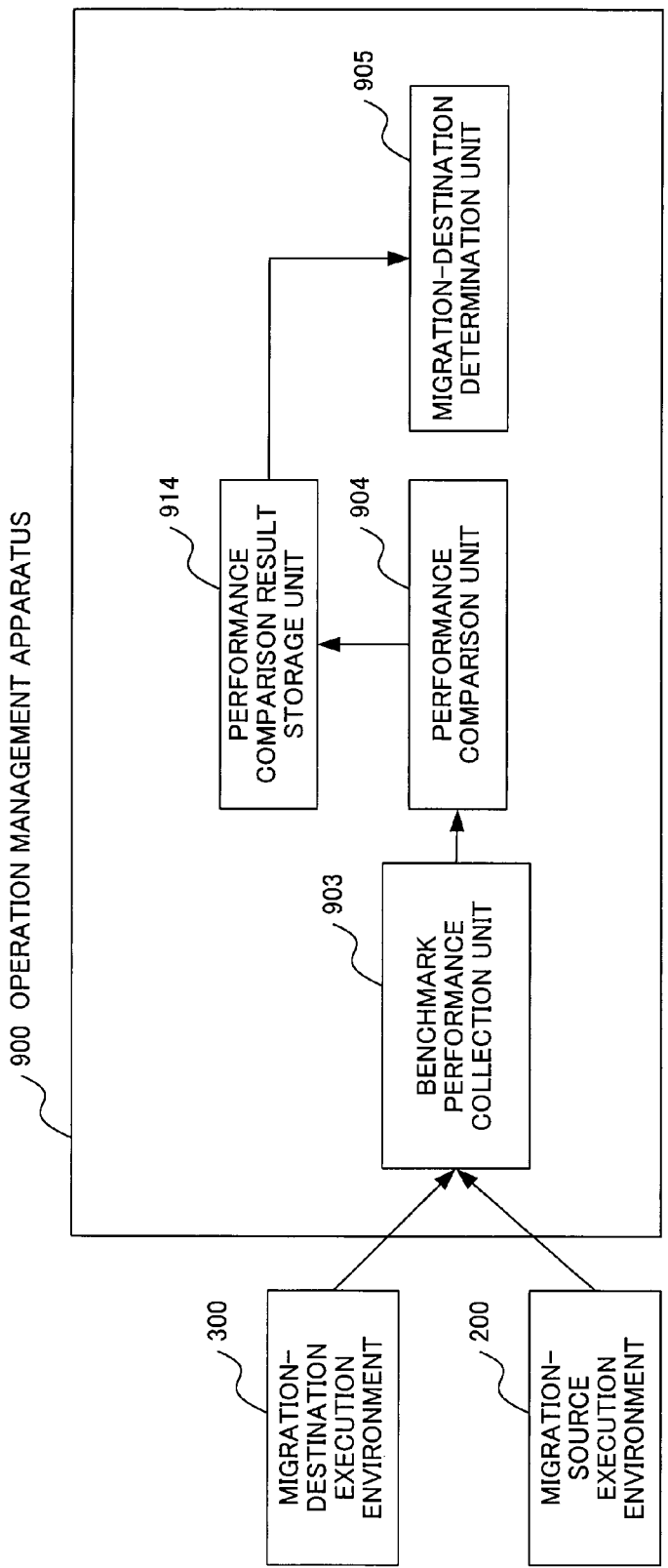
FIG. 4 is a block diagram illustrating a configuration of an operation management system that includes an operation management apparatus 900 underlying the present invention.

FIG. 4 is a block diagram illustrating a configuration of an operation management system that includes the operation management apparatus 900, underlying the present invention.

Referring to FIG. 4, the operation management apparatus 900 underlying the present invention includes a benchmark performance collection unit 903, a performance comparison unit 904, a performance comparison result storage unit 914, and a migration-destination determination unit 905. The operation management apparatus 900 is connected to a migration-source execution environment 200 and a migration-destination execution environment 300 by a network or the like that is not illustrated.

Figure 2:
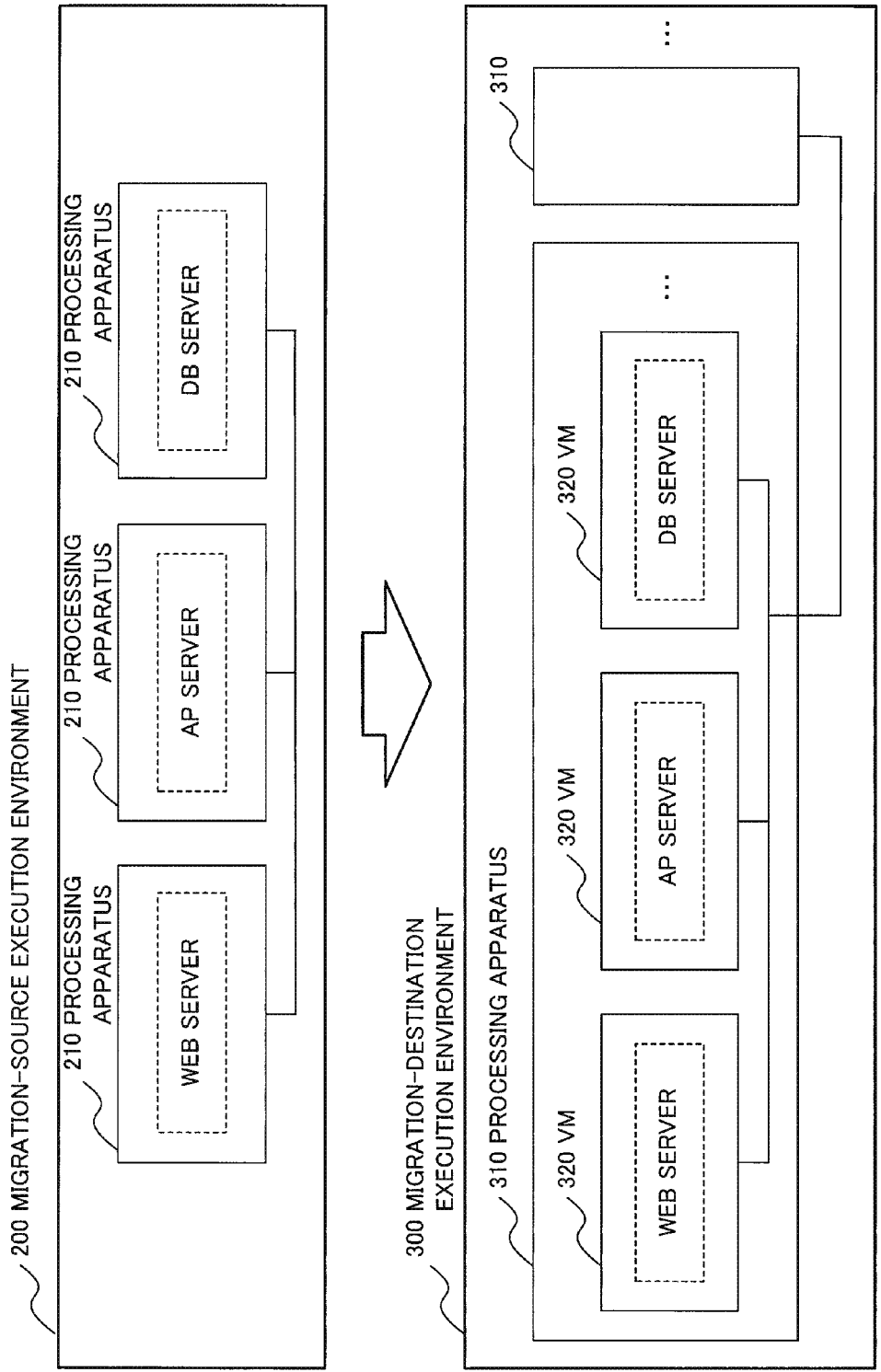
FIG. 2 is a block diagram illustrating a configuration example of a migration-source execution environment 200 and a migration-destination execution environment 300.

FIG. 2 is a block diagram illustrating a configuration example of the migration-source execution environment 200 and the migration-destination execution environment 300.

Referring to FIG. 2, the migration-source execution environment 200 includes one or more processing apparatuses 210. The migration-destination execution environment 300 includes one or more processing apparatuses 310. The processing apparatuses 210 and the processing apparatuses 310 are computers on which a system for providing an information communication service, such as a web service and a business service, is constructed. In the example of FIG. 2, in the migration-source execution environment 200, a system is constructed of a WEB server, an AP server, and a DB server, and the processing of programs of each of these servers is executed by the processing apparatus 210. The one or more processing apparatuses 210 are connected to each other by a network. Furthermore, in the migration-destination execution environment 300, the processing of programs of each server is executed on a VM (Virtual Machine) 320 of the processing apparatus 310. The one or more processing apparatuses 310 are connected to each other by a network.

In this example, in the migration-source execution environment 200, each processing apparatus 210 in which the processing of programs of the corresponding server is executed is assumed to be a migration-source processing system (or first processing system). Furthermore, in the migration-destination execution environment 300, each VM 320 in which the processing of programs of the corresponding server is executed is assumed to be a migration-destination processing system (or second processing system).

The benchmark performance collection unit 903 collects measured values (benchmark performances) of a plurality of performance items obtained when a process of giving a load in a predetermined method is executed in the migration-source processing system and the migration designation processing system. In this example, the performance items are referred to as metrics. The metrics correspond to the elements in PTLs 5 and 6. Here, as metrics, rates of usage or amounts of usage of computer resources, for example, the amount of usage of a CPU (CPU), the amount of usage of a memory (MEM), the disk access frequency (DISK), the amount of data sent and received (NW), and the like, are used. The benchmark performance collection unit 903 collects benchmark performances with regard to the metrics determined beforehand by an administrator or the like.

The performance comparison unit 904 compares the processing performances of the migration-source processing system and the migration-destination processing system on the basis of the benchmark performances collected by the benchmark performance collection unit 903.

The performance comparison result storage unit 914 stores performance comparison results 924 from the performance comparison unit 904.

The migration-destination determination unit 905 generates a recommended plan of the migration-destination processing systems on the basis of the performance comparison results 924, and presents the recommended plan to the administrator or the like.

Next, operations of the operation management apparatus 900 underlying the present invention will be described.

Figure 5:
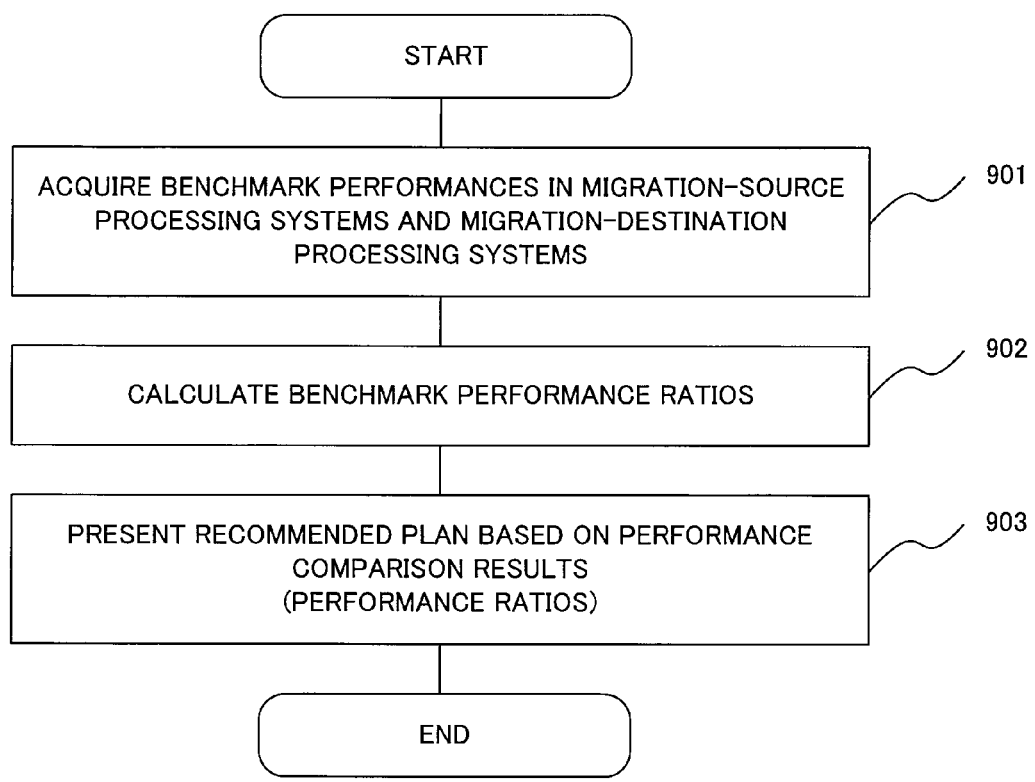
FIG. 5 is a flowchart illustrating a process of the operation management apparatus 900 underlying the present invention.

FIG. 5 is a flowchart illustrating a process of the operation management apparatus 900 underlying the present invention.

Here, it is assumed that the WEB server, the AP server and the DB server that constitute the system in FIG. 2 are migrated from the migration-source processing systems (processing apparatuses 210) to the migration-destination processing systems (VMs 320). Furthermore, it is assumed that as for the VMs 320 usable as the migration-destination processing systems, there is a plurality of plans.

Figure 3:
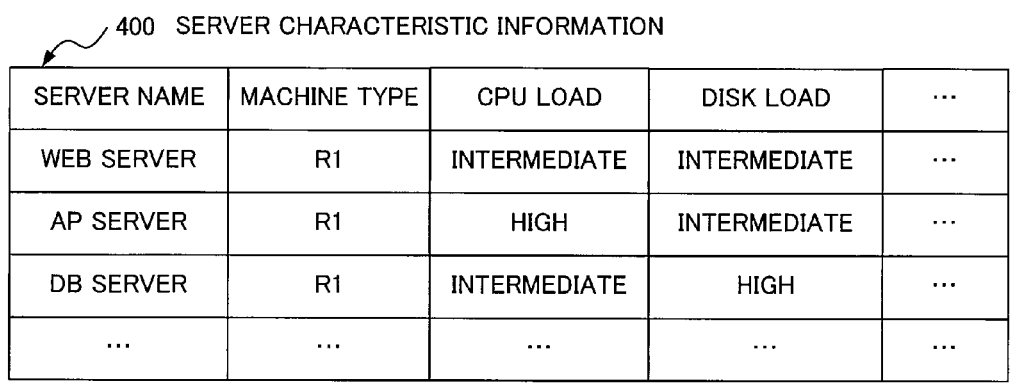
FIG. 3 is a diagram illustrating an example of server characteristics information 400.

FIG. 3 is a diagram illustrating an example of server characteristics information 400. The server characteristics information 400 indicates, with regard to each server that constitutes a system, a machine type of the migration-source processing system (processing apparatus 210) in which the processing of the server is executed, and characteristics of the processing of the server (CPU load, disk load, and the like). In the example in FIG. 3, it is indicated that the processing in each server is executed by the processing apparatuses 210 with the same machine type "R1". It is also indicated that the processing in the AP server is high in CPU load, and the processing in the DB server is high in disk load.

First, the benchmark performance collection unit 903 acquires benchmark performances in the migration-source processing system and the migration-destination processing systems (step S901). Here, the benchmark performance collection unit 903 acquires benchmark performances regarding metrics designated beforehand by the administrator or the like.

For example, in the case where the metrics designated by the administrator are "CPU", "MEM" and "DISK", the benchmark performance collection unit 903 acquires benchmark performances regarding the metrics "CPU", "MEM" and "DISK" in the migration-source processing system (processing apparatus 210) and the migration-destination processing systems (VMs 320) of the plurality of plans.

Next, the performance comparison unit 904 calculates benchmark performance ratios on the basis of the benchmark performances in the migration-source processing system and the migration-destination processing systems (step S902). It is to be noted herein that a benchmark performance ratio is a ratio of the benchmark performance of each metric in the migration-destination processing systems to the benchmark performance of a corresponding metric in the migration-source processing system assumed to be 1. The performance comparison unit 904 sets the calculated benchmark performance ratios as "performance ratios" of the performance comparison results 924. The performance comparison unit 904 stores the performance comparison results 924 in the performance comparison result storage unit 914.

FIG. 6 is a diagram illustrating the performance comparison results 924 in an operation management system underlying the present invention. The performance comparison results 924 include, for each of the migration-source processing system and the plans of migration-destination processing system, the machine type, the metrics, the benchmark performances of the metrics, and the performance ratios. The performance comparison results 924 further include the use and price for each plan of the migration-destination processing system.

In the example in FIG. 6, the benchmark performances of the metrics "CPU", "MEM" and "DISK" of the processing apparatus 210 of the machine type "R1" that is a migration-source processing system are "80", "60" and "50", respectively.

Furthermore, as migration-destination processing systems, plans of four kinds of VMs 320, a "plan A" to a "plan D", which vary in resource performance and price, are indicated according to the uses ("low-load use", "standard use", "calculation use", and "storage use"). Here, the VMs 320 of the "plan A", the "plan B" and the "plan D" are deployed in processing apparatuses 310 of a machine type "S1". Furthermore, the VM 320 of the "plan C" is deployed in a processing apparatus 310 of a machine type "S2".

Then, for example, the benchmark performances of the metrics "CPU", "MEM" and "DISK" of the "plan B" are "120", "72" and "60", respectively, and the benchmark performance ratios thereof are "1.5", "1.2" and "1.2", respectively.

Incidentally, as illustrated in FIG. 6, with regard to the migration-source processing system, as well, a benchmark performance ratio of "1" that serves as a reference is set as a "performance ratio" of the performance comparison results 924.

For example, the performance comparison unit 904 stores the performance comparison results 924 in FIG. 6.

Next, the migration-destination determination unit 905 presents a recommended plan generated on the basis of the performance comparison results 924 to the administrator or the like (step S903). The recommended plan indicates plans of migration-destination processing system (VM 320) to which the individual servers that constitute the system are migrated. The migration-destination determination unit 905 selects plans of the migration-destination processing systems to which the respective servers are migrated, on the basis of the server characteristics information 400 and the performance ratios in the performance comparison results 924.

Figure 7:
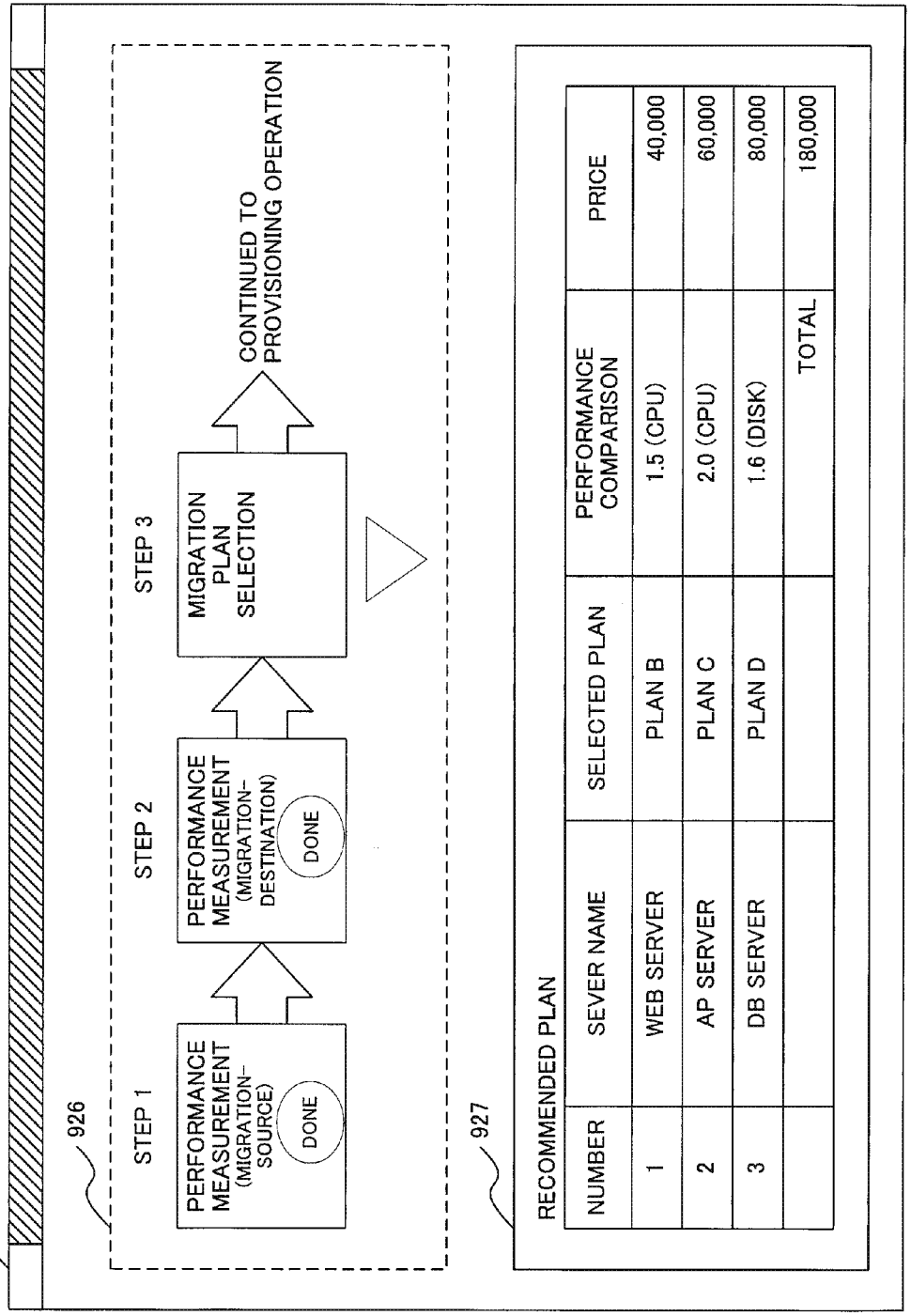
FIG. 7 is a diagram illustrating an example of a display screen 925 of a recommended plan in the operation management system underlying the present invention.

FIG. 7 is a diagram illustrating an example of a display screen 925 of a recommended plan in an operation management system underlying the present invention. A display screen 925 includes migration steps 926 and a recommended plan 927.

The migration steps 926 indicate the present step among the processing steps for migration. In the example in FIG. 7, it is indicated that the present processing step is a step (step 3) of selecting a plan (migration plan) for a migration-destination processing system, which is subsequent to measurement steps (steps 1 and 2) for benchmark performances in the migration-source processing system and migration-destination processing system.

Furthermore, the recommended plan 927 includes selected plans, performance comparisons, and prices. The selected plans indicate plans of migration-destination processing system for each server, which have been selected on the basis of the performance ratios in the performance comparison results 924 in FIG. 6 and the server characteristics information 400 in FIG. 3. The performance comparison indicates metrics used for selection and the performance ratios regarding the metrics. The prices indicate the prices of the plans of migration-destination processing systems.

Here, with regard to the AP server, since the CPU load is high, the "plan C" in which the performance ratio of the metric "CPU" is a maximum (2.0) has been selected. With regard to the DB server, since the disk load is high, the "plan D" in which the performance ratio of the metric "DISK" is a maximum (1.6) has been selected. With regard to the WEB server, since the CPU load and the disk load are both at an intermediate level, the "plan B" in which the performance ratio of the metric "CPU" is 1.5 and the performance ratio of the metric "DISK" is 1.2 has been selected.

For example, the migration-destination determination unit 905 presents a display screen 925 in FIG. 7.

As described above, in the operation management apparatus 900 underlying the present invention, the benchmark performance collection unit 903 acquires benchmark performances in the migration-source processing system and the migration-destination processing systems, regarding the metrics determined beforehand by the administrator or the like. Then, the performance comparison unit 904 calculates benchmark performance ratios on the basis of the acquired benchmark performances and generates performance comparison results 924.

Due to this, before the systems are actually migrated from the migration-source execution environment 200 to the migration-destination execution environment 300, processing performances needed in the migration-destination execution environment 300 can be estimated.

(First Exemplary Embodiment)

Next, a first exemplary embodiment of the present invention will be described.

Figure 8:
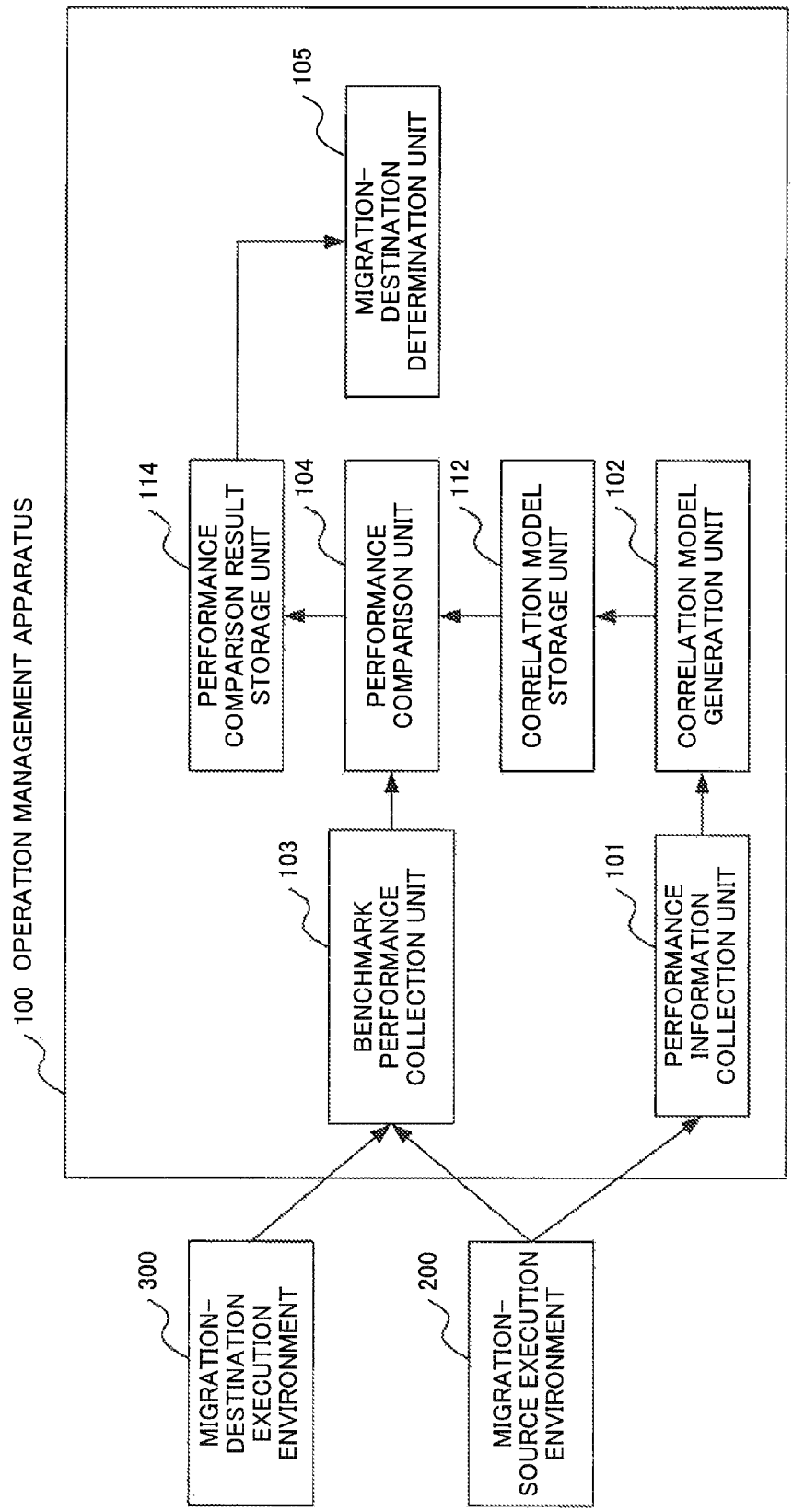
FIG. 8 is a block diagram illustrating a configuration of an operation management system that includes an operation management apparatus 100 in the first exemplary embodiment of the present invention.

First, a configuration of an operation management apparatus 100 of the first exemplary embodiment of the present invention will be described. FIG. 8 is a block diagram illustrating a configuration of an operation management system that includes the operation management apparatus 100 in the first exemplary embodiment of the present invention.

Referring to FIG. 8, the operation management apparatus 100 of the first exemplary embodiment of the present invention includes a performance information collection unit 101, a correlation model generation unit 102, a correlation model storage unit 112, a benchmark performance collection unit 103, a performance comparison unit 104, a performance comparison result storage unit 114, and a migration-destination determination unit 105.

The performance information collection unit 101 collects performance values of a plurality of metrics from migration-source processing systems in a predetermined performance information collection cycle while processing (service) by a program of a migration-target system is being executed, in the migration-source processing systems. Here, a set of values of the plurality of metrics measured at the same time is defined as performance information. The performance information collection unit 101 collects performance information regarding the metrics determined beforehand by the administrator or the like.

The correlation model generation unit 102 generates a correlation model 122 of the migration-source processing systems on the basis of time-series change in the performance information during a predetermined period.

The correlation model storage unit 112 stores the correlation model 122 (performance model) generated by the correlation model generation unit 102.

The benchmark performance collection unit 103 collects benchmark performances in the migration-source processing system and the migration-destination processing systems. The benchmark performance collection unit 103, unlike the benchmark performance collection unit 903, collects benchmark performances regarding the metrics designated by the performance comparison unit 104.

The performance comparison unit 104 determines metrics to be collected as benchmark performances on the basis of the correlation model 122 of the migration-source processing systems, and designates the metrics to the benchmark performance collection unit 103. Furthermore, the performance comparison unit 104 compares the processing performances in the migration-source processing system and the migration-destination processing systems on the basis of the benchmark performances collected by the benchmark performance collection unit 103. Here, the performance comparison unit 104 corrects the benchmark performance ratios of the migration-source processing system and the migration-destination processing systems on the basis of the correlation model 122 of the migration-source processing systems.

The performance comparison result storage unit 114 stores the performance comparison results 124 provided by the performance comparison unit 104.

The migration-destination determination unit 105 generates a recommended plan for the migration-destination processing systems (VMs 320) on the basis of the performance comparison results 124, and presents the recommended plan to the administrator or the like.

Incidentally, the operation management apparatus 100 may be a computer that includes a CPU and a storage medium storing programs and that operates by controls based on the programs. Furthermore, the correlation model storage unit 112 and the performance comparison result storage unit 114 may be individually constructed of a separate storage medium or may be constructed of one storage medium.

Next, operation of the operation management apparatus 100 in the first exemplary embodiment of the present invention will be described.

Figure 9:
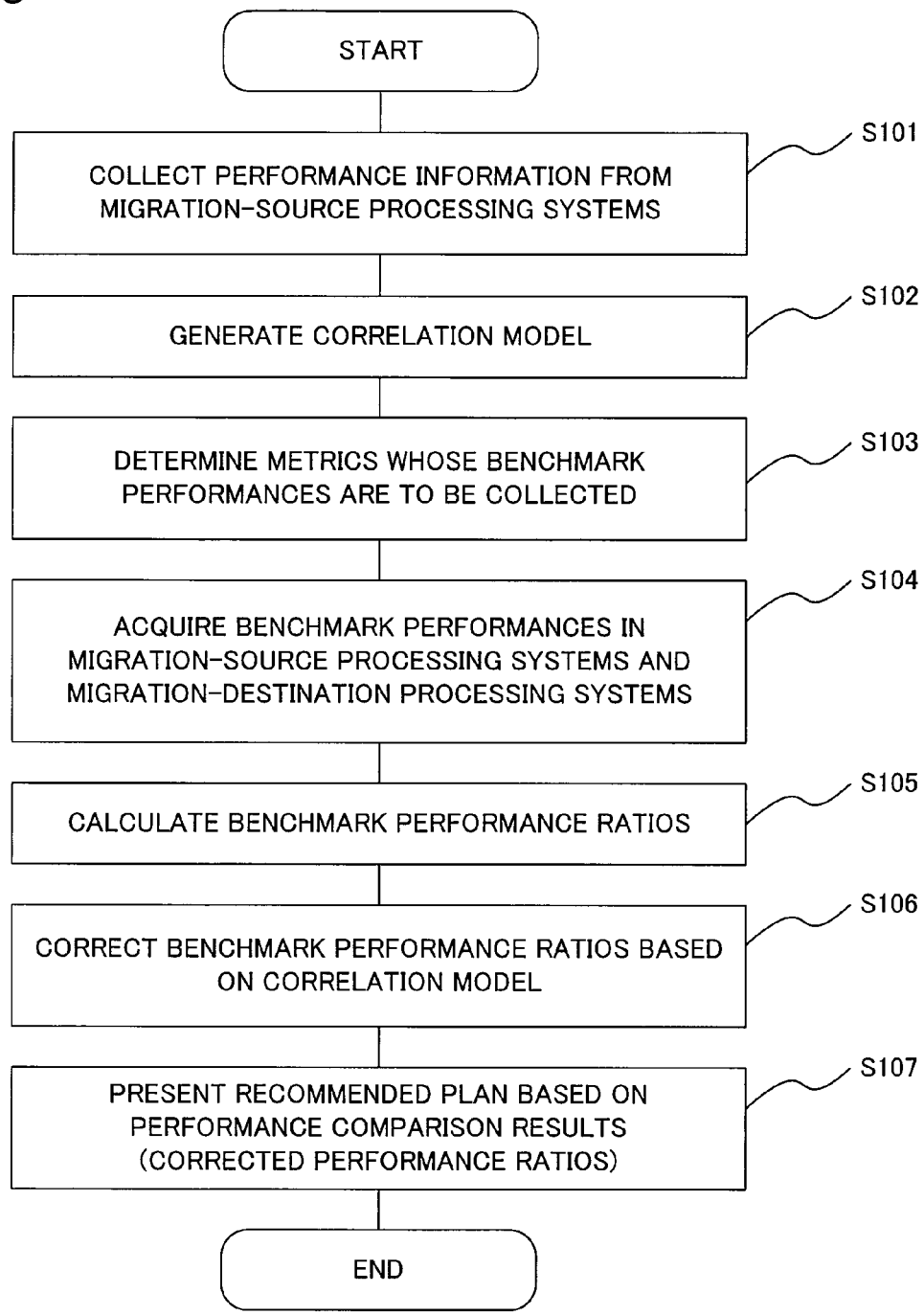
FIG. 9 is a flowchart illustrating a process of the operation management apparatus 100 in the first exemplary embodiment of the present invention.

FIG. 9 is a flowchart illustrating a process of the operation management apparatus 100 in the first exemplary embodiment of the present invention.

Herein, similarly to the above-described operation management apparatus underlying the present invention, it is assumed that the WEB server, the AP server, and the DB server that constitute the systems in FIG. 2 are migrated from the migration-source processing systems (processing apparatuses 210) to the migration-destination processing systems (VMs 320).

First, the performance information collection unit 101 collects performance information from migration-source processing systems in a predetermined performance information collection cycle while the processing (service) by a program of a migration-target system is being executed, in the migration-source processing systems (step S101).

FIG. 10 is a diagram illustrating an example of the performance information in the first exemplary embodiment of the present invention. In the example in FIG. 10, the performance information includes, as metrics, the values of various metrics (CPU, MEM, DISK) in the migration-source processing systems (processing apparatuses 210) in which the processes of the servers (the WEB server, the AP server, and the DB server) are executed. Furthermore, in the example in FIG. 10, performance information obtained every one minute is collected.

For example, the performance information collection unit 101 collects performance information as in FIG. 10.

The correlation model generation unit 102 generates a correlation model 122 of the migration-source processing systems on the basis of the time-series changes in the performance information during a predetermined period (step S102). The correlation model generation unit 102 stores the generated correlation model 122 in the correlation model storage unit 112.

Here, each correlation model 122 includes correlation functions (or conversion functions) that indicate correlations between the metrics, for each pair (couple) of metrics, of the plurality of metrics. A correlation function is a function that predicts, from the time series of values of one metric of a pair of metrics, a time series of values of the other metric. The correlation model generation unit 102 determines a coefficient of the correlation function regarding each pair of metrics on the basis of the performance information during a predetermined modeling period. The coefficient of a correlation function is determined in a system identification process performed on the time series of measured values of a metric, similarly to the operation management apparatuses of PTLs 5 and 6. Then, the correlation model generation unit 102, similarly to the operation management apparatuses of PTLs 5 and 6, calculates, regarding each pair of the metrics, the weight of the correlation function on the basis of a conversion error of the correlation function, and sets the set of the correlation functions (effective correlation functions) whose weights are equal to or greater than a predetermined value as a correlation model 122.

FIG. 11 is a diagram illustrating an example of the correlation model 122 in the first exemplary embodiment of the present invention. In the example of FIG. 11, the correlation model 122 includes coefficients ($\alpha$, $\beta$) and a weight of a correlation function for each pair of an input metric (X) and an output metric (Y). Here, it is assumed that the correlation function is $Y=\alpha X+\beta$. For example, with regard to the WEB server, "$\alpha=0.8$" and "$\beta=10$" have been calculated for the input metric X "CPU" and the output metric Y "DISK". Similarly, with regard to each of the AP server and the DB server, coefficients of a correlation function have been calculated for the input metric X "CPU" and the output metric Y "DISK".

For example, the correlation model generation unit 102 generates a correlation model 122 as in FIG. 11, on the basis of the performance information in FIG. 10.

Incidentally, as long as, from the time series of the value of one metric of a pair of metrics, a time series of the value of the other metric can be predicted, the correlation model generation unit 102 may use another function expression as a correlation function. For example, the correlation model generation unit 102, using Y1 and Y2 that are the past time series of Y, and X1 and X2 that are the past time series of X, may calculate coefficients a to e of a function expression $Y=aY1+bY2+cX1+dX2+e$.

Next, the performance comparison unit 104 determines metrics regarding which benchmark performances are to be collected, on the basis of the correlation model 122 of the migration-source processing systems (step S103). Here, the performance comparison unit 104 determines a metric having a correlation with another metric in the correlation model 122 to be a metric regarding which a benchmark performance is to be collected. Then, the performance comparison unit 104 instructs the benchmark performance collection unit 103 to acquire benchmark performances regarding the metrics.

For example, in the correlation model 122 of FIG. 11, the metrics "CPU" and "DISK" of the WEB server have a correlation with other metrics. Similarly, the metrics "CPU" and "DISK" of each of the AP server and the DB server have a correlation with other metrics. The performance comparison unit 104 determines these metrics "CPU" and "DISK" to be metrics regarding which benchmark performances are to be collected.

The benchmark performance collection unit 103 acquires benchmark performances in the migration-source processing system and the migration-destination processing systems (step S104). Here, the benchmark performance collection unit 103 acquires benchmark performances of the metrics designated by the performance comparison unit 104.

For example, the benchmark performance collection unit 103 acquires benchmark performances of the metrics "CPU" and "DISK" in the migration-source processing system (processing apparatus 210) and the migration-destination processing systems (VMs 320) of a plurality of plans.

Incidentally, the benchmark performance collection unit 103 may acquire benchmark performances of metrics determined beforehand by the administrator or the like, in addition to the metrics having correlations with other metrics, which are designated by the performance comparison unit 104.

Next, the performance comparison unit 104 calculates a benchmark performance ratio on the basis of the benchmark performances in the migration-source processing system and the migration-destination processing systems (step S105). The performance comparison unit 104 sets the calculated benchmark performance ratio as a "performance ratio 1" in the performance comparison results 124.

FIG. 12 is a diagram illustrating the performance comparison results 124 in the first exemplary embodiment of the present invention. The performance comparison results 124 include items similar to those of the performance comparison results 924 described above. Here, the performance comparison results 124 include as performance ratios a "performance ratio 1" and a "performance ratio 2". For the "performance ratio 1", a benchmark performance ratio is set. For the "performance ratio 2", a benchmark performance ratio corrected on the basis of the presence/absence of a correlation in the correlation model 122 is set.

In the example in FIG. 12, the benchmark performances of the metrics "CPU" and "DISK" of a processing apparatus 210 of a machine type "R1", which is a migration-source processing system, are "80" and "50", respectively. Furthermore, for example, the benchmark performances of the metrics "CPU" and "DISK" of the "plan B" are "120" and "60", respectively, and the benchmark performance ratios (performance ratios 1) thereof are "1.5" and "1.2", respectively.

Incidentally, as illustrated in FIG. 12, with regard to the migration-source processing system, as well, benchmark performance ratios "1" that serve as references are set as "performance ratios 1" and "performance ratios 2" of the performance comparison results 124.

For example, the performance comparison unit 104 sets benchmark performance ratios (performance ratios 1) as in the performance comparison results 124 in FIG. 12.

Furthermore, the performance comparison unit 104 corrects the benchmark performance ratios of the migration-source processing system and the migration-destination processing systems, on the basis of the presence/absence of a correlation in a correlation model 122 (step S106). The performance comparison unit 104 sets the corrected benchmark performance ratios (corrected performance ratios) as "performance ratios 2" of the performance comparison results 124.

Herein, it is assumed that, with regard to the performances of metrics, when processing (service) by a program of the system of a migration target is being executed, the performance of one metric of a pair of metrics having a correlation in the correlation model 122 does not improve independently from the performance of the other metric.

Therefore, in the first exemplary embodiment of the present invention, with regard to a pair of metrics having a correlation, the performance ratio of a metric of which the benchmark performance ratio is large is restricted by the benchmark performance ratio of the other metric of which the benchmark performance ratio is small. The performance comparison unit 104 sets, with regard to the pair of metrics having a correlation, the benchmark performance ratio (performance ratio 1) of the metric of which the benchmark performance ratio is small to a corrected performance ratio (performance ratio 2) of the metric of which the benchmark performance ratio is large. Furthermore, the performance comparison unit 104 directly sets the benchmark performance ratio (performance ratio 1) of the metric of which the benchmark performance ratio is small to a corrected performance ratio (performance ratio 2) of the metric of which the benchmark performance ratio is small.

For example, in the correlation model 122 in FIG. 11, there is a correlation between the metrics "CPU" and "DISK" of the WEB server. Similarly, there is also a correlation between the metrics "CPU" and "DISK" of each of the AP server and the DB server. Therefore, the performance comparison unit 104 sets, with regard to the metrics "CPU" and "DISK" having a correlation, the benchmark performance ratio (performance ratio 1) of a metric whose benchmark performance ratio is small to a corrected performance ratio (performance ratio 2) of a metric whose benchmark performance ratio is large.

As a result, in FIG. 12, the corrected performance ratio (performance ratio 2) of the metric "CPU" of the "plan B" is restricted to "1.2", which is the benchmark performance ratio (performance ratio 1) of the metric "DISK". As the corrected performance ratio (performance ratio 2) of the metric "DISK", "1.2", which is the benchmark performance ratio (performance ratio 1) of the metric "DISK", is directly set. Similarly, the corrected performance ratio (performance ratio 2) of the metric "CPU" of the "plan C" is restricted to "1.2", which is the benchmark performance ratio (performance ratio 1) of the metric "DISK". The corrected performance ratio (performance ratio 2) of the metric "DISK" of the "plan D" is restricted to "1.5", which is the benchmark performance ratio (performance ratio 1) of the metric "CPU".

For example, the performance comparison unit 104 sets corrected performance ratios (performance ratios 2) as in the performance comparison results 124 in FIG. 12.

Incidentally, the performance comparison unit 104 may output the performance comparison results 124 to the administrator or the like.

Next, the migration-destination determination unit 105 presents a recommended plan generated on the basis of the performance comparison results 124 to the administrator or the like (step S107). Here, the migration-destination determination unit 105 selects plans of migration-destination processing systems (VMs 320) to which the servers are to be migrated on the basis of the performance ratios 2 in the performance comparison results 124 and the server characteristics information 400, and generates a recommended plan. The migration-destination determination unit 105 presents the generated recommended plan.

Figure 13:
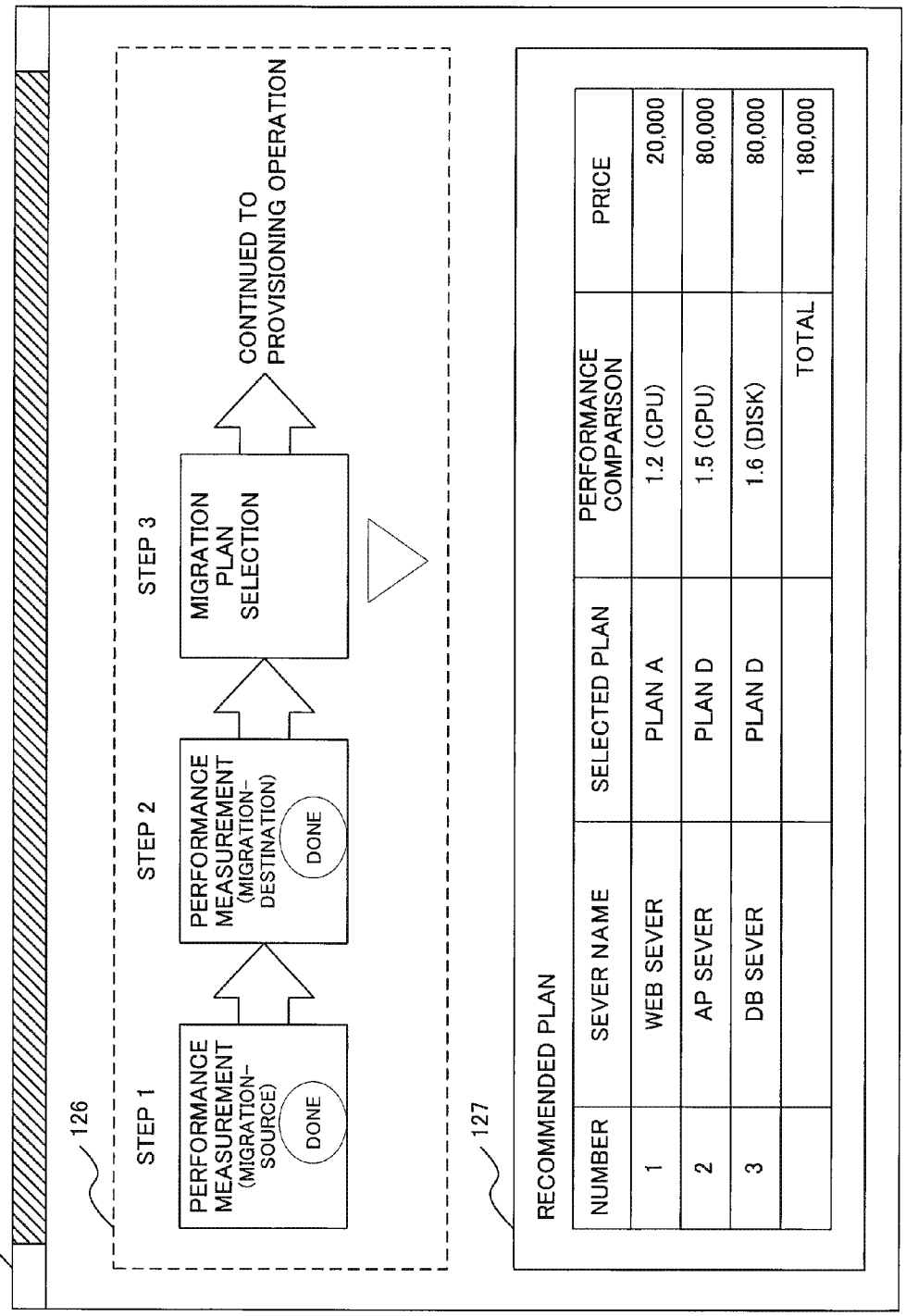
FIG. 13 is a diagram illustrating an example of a display screen 125 of a recommended plan in the first exemplary embodiment of the present invention.

FIG. 13 is a diagram illustrating an example of a display screen 125 of a recommended plan in the first exemplary embodiment of the present invention. The display screen 125, similar to the display screen 925, includes migration steps 126 and a recommended plan 127. In this case, the selected plans of the recommended plan 127 indicate plans of migration-destination processing systems for each of servers which have been selected on the basis of the performance ratios 2 in the performance comparison results 124 in FIG. 12 and the server characteristics information 400 in FIG. 3. Furthermore, the performance comparison indicates the metrics used for the selection and the performance ratios 2 thereof.

Here, with regard to the AP server, the "plan D" in which the performance ratio 2 of the metric "CPU" is a maximum (1.5) has been selected. With regard also to the DB server, the "plan D" in which the performance ratio 2 of the metric "DISK" is a maximum (1.6) has been selected. With regard to the WEB server, the "plan A" whose price is the cheapest in the "plan A", the "plan B" and the "plan C" in which the performance ratios 2 of the metrics "CPU" are about the same.

In an operation system underlying the present invention, the "plan B", the "plan C" and the "plan D" have been respectively presented as recommended plans for the WEB server, the AP server and the DB server on the basis of the benchmark performance ratios, as in the display screen 925 in FIG. 7. In contrast, in the first exemplary embodiment of the present invention, the "plan A", the "plan D" and the "plan D" are presented on the basis of the corrected performance ratios (performance ratios 2).

For example, the migration-destination determination unit 105 presents a display screen 125 in FIG. 13.

Incidentally, the migration-destination determination unit 105 may present both the recommended plan selected on the basis of the benchmark performance ratios (performance ratios 1) and the recommended plan selected on the basis of the corrected performance ratios (performance ratios 2).

Furthermore, in the example described above, the processing of the servers is executed in the migration-source processing systems (processing apparatuses 210) of the same machine type. However, in the case where the processing of the servers is executed in migration-source processing systems of different machine types, benchmark performance ratios (performance ratios 1) and corrected performance ratios (performance ratios 2) are calculated separately for each server on the basis of the benchmark performances collected with regard to each migration-source processing system. In this case, a plan of a migration-destination processing system (VM 320) to which a server is to be migrated is determined on the basis of the performance ratios 2 calculated for the server.

Furthermore, in the example described above, the pairs of metrics having a correlation (the input metric "CPU" and the output metric "DISK") are of the same metrics in each server. However, in the case where the pairs of metrics having a correlation are different in each server, the benchmark performances of metrics pursuant to the correlation of each server are collected, and benchmark performance ratios (performance ratios 1) and corrected performance ratios (performance ratios 2) are calculated separately for each server. Also in this case, a plan of a migration-destination processing system (VM 320) to which a server is to be migrated is determined on the basis of the performance ratios 2 calculated for the server.

Furthermore, although in the example described above, the processing apparatuses 210 in the migration-source execution environment 200 are assumed to be migration-source processing systems, the VMs in the migration-source execution environment 200 may instead be assumed to be migration-source processing systems. Similarly, although in the example described above, the VMs 320 in the migration-destination processing systems are assumed to be migration-destination processing systems, the processing apparatuses 310 in the migration-destination processing systems may instead be assumed to be migration-destination processing systems. Furthermore, a set of one or more processing apparatuses, or a set of one or more VMs, or a set in which one or more processing apparatuses and one or more VMs exist in mixture may be assumed to be a migration-source processing system or a migration-destination processing system.

As described above, operations of the first exemplary embodiment of the present invention are completed.

Figure 1:
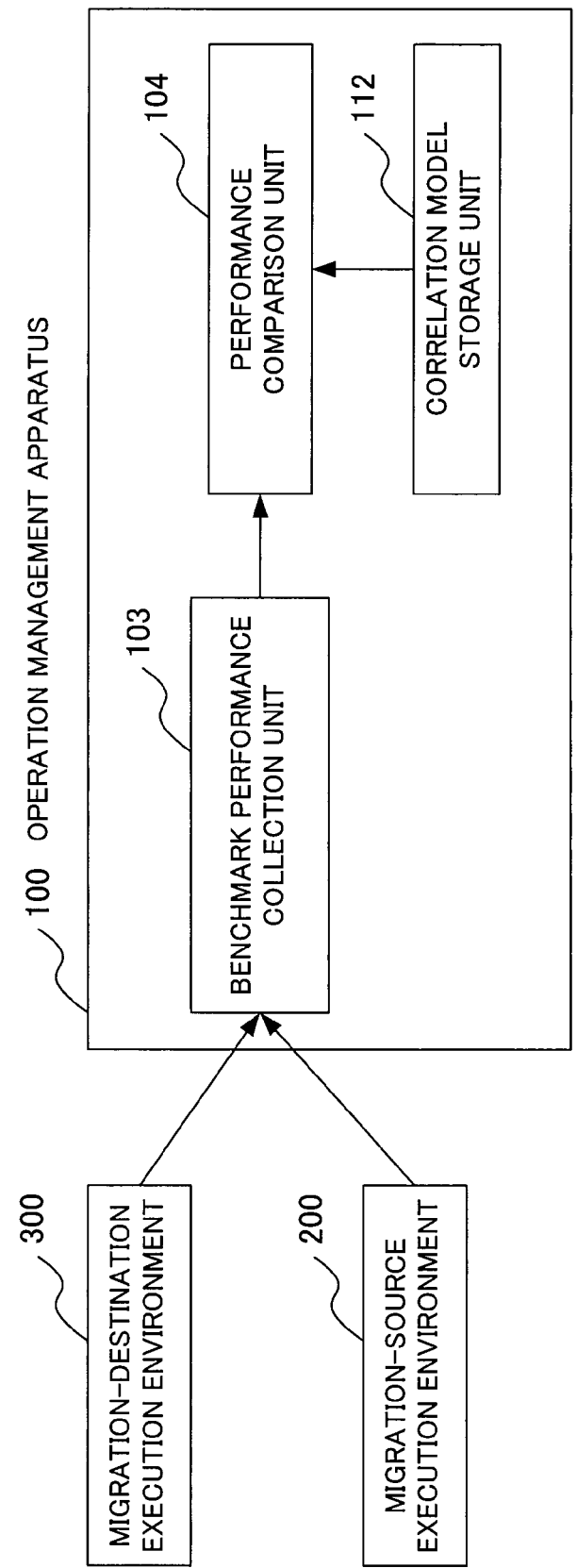
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating a characteristic configuration of the first exemplary embodiment of the present invention.

With reference to FIG. 1, an operation management apparatus 100 includes a correlation model storage unit 112, a benchmark performance collection unit 103, and a performance comparison unit 104. The correlation model storage unit 112 stores a correlation model indicating a correlation for each pair of one or more metrics in a state of executing a predetermined program in a first processing system. The benchmark performance collection unit 103 collects values of a metric having a correlation with another metric in the correlation model in a state of executing a predetermined benchmark process in the first processing system and a second processing system, respectively. The performance comparison unit 104 calculates and outputs a performance ratio of a metric in the second processing system to the metric in the first processing system, based on the values of the metrics in the state of executing the predetermined benchmark process in the first processing system and the second processing system, respectively.

Next, advantageous effects of the first exemplary embodiment of the present invention will be described.

According to the first exemplary embodiment of the present invention, it is possible to improve the accuracy of the estimate of the processing performance needed for the execution environment of a migration-destination, which is performed in system migration. A reason for that is that the benchmark performance collection unit 103 collects benchmark performances of metrics which each have a correlation with another metric in the correlation model 122, in migration-source processing system and migration-destination processing systems, and the performance comparison unit 104 calculates performance ratios of migration-destination processing systems to the migration-source processing system on the basis of the benchmark performances. Due to this, compared with the case where benchmark performances are uniformly acquired with respect to the metrics determined beforehand, the accuracy of the estimate of the processing performance is improved because performance ratios are calculated with respect to metrics which each have a correlation with another metric and which are actually utilized in a system (service). Furthermore, due to this, the processing load related to the acquisition of benchmark performances and the calculation of performance ratios considerably reduces, and, furthermore, the selecting metrics useful for evaluation of processing performances, and the like, become unnecessary, so that estimate of the processing performance is effectively executed.

For example, in the case where, in the migration of a system constructed of a plurality of servers, the communication performance between servers is evaluated as metrics, the processing load becomes large if the communication performance is measured with respect to the routes for all combinations of a plurality of processing apparatuses or VMs in which the individual servers are allocated. If the communication performance is measured with respect to only the routes selected by the administrator or the like, the routes that the individual servers actually utilize may not be measured, and therefore there is possibility that the accuracy of the estimate of the processing performance may decline. In the first exemplary embodiment of the present invention, the acquisition of benchmark performances and the calculation of performance ratios are performed with respect to the routes that are actually utilized in the system, and therefore, the estimate of the processing performances will be efficiently and accurately executed.

Furthermore, according to the first exemplary embodiment of the present invention, the accuracy of the estimate of the processing performances needed for the execution environment of a migration-destination can be further improved. A reason for that is that the performance comparison unit 104 calculates, as a performance ratio, a value in which the benchmark performance ratio has been corrected on the basis of the presence/absence of a correlation in the correlation model 122.

For example, in the case where the servers are migrated in accordance with the recommended plan in FIG. 7 that has been generated on the basis of the performance ratios in the performance comparison results 924 in FIG. 6 as in the operation management system underlying the present invention, the VM 320 of the plan C to which the AP server is migrated does not actually have a sufficient performance, and therefore is likely to become a bottle neck. In addition, the VM 320 of the plan B to which the WEB server is migrated actually has only a performance that is comparable to that of the plan A cheaper than the plan B, which means that a comparatively expensive plan has been selected. In contrast, in the first exemplary embodiment of the present invention, correction is made as in the performance ratios 2 of the performance comparison results 124 in FIG. 12 so that the accuracy of the performance ratios becomes higher according to the presence/absence of a correlation in the correlation model 122. Then, following the recommended plan as in FIG. 13 that has been generated on the basis of the corrected performance ratios, the servers are migrated. Due to this, the AP server is actually migrated to the VM 320 of the plan D whose performance is higher, so that the possibility of a bottleneck declines. Furthermore, the WEB server is migrated to the VM 320 of the plan A, which is cheaper, so that cost efficiency is improved.

Furthermore, the metrics included in the correlation model 122 (performance model) in the first exemplary embodiment of the present invention are utilized for, for example, fault monitoring during operation of the system as disclosed in PTLs 5 and 6. Therefore, according to the first exemplary embodiment of the present invention, using the metrics for use in fault monitoring of a system and information about correlations of the metrics allows the performance estimate to be carried out from substantially the same viewpoints as in the case where fault monitoring is carried out after the system is migrated.

(Second Exemplary Embodiment)

Next, a second exemplary embodiment of the present invention will be described.

The second exemplary embodiment of the present invention is different from the first exemplary embodiment of the present invention in that correction of a benchmark performance ratio is carried out on the basis of a coefficient of a correlation function in the correlation model 122.

FIG. 14 is a diagram illustrating performance comparison results 124 in the second exemplary embodiment of the present invention. The performance comparison results 124 in the second exemplary embodiment of the present invention further include "performance ratios 3" as performance ratios.

In step S106 described above, the performance comparison unit 104 corrects the benchmark performance ratios of the migration-source processing system and the migration-destination processing systems on the basis of the coefficients of the correlation function in the correlation model 122. The performance comparison unit 104 sets the corrected benchmark performance ratios (corrected performance ratios) as "performance ratios 3" of the performance comparison results 124.

In the second exemplary embodiment of the present invention, it is assumed that the relation between the performance ratio of an input metric of a correlation and the performance ratio of an output metric is a relation pursuant to the coefficient of the correlation function.

Therefore, in the second exemplary embodiment of the present invention, the ratio of the performance ratio of the output metric to the performance ratio of the input metric of a correlation is restricted to the value of the coefficient of the correlation function. The performance comparison unit 104 sets, in the case where a calculated value obtained by multiplying the benchmark performance ratio (performance ratio 1) of the input metric of a correlation by a coefficient α of the correlation function is equal to or smaller than the benchmark performance ratio (performance ratio 1) of the output metric, the calculated value to a corrected performance ratio (performance ratio 3) of the output metric. In this case, the performance comparison unit 104 directly sets the benchmark performance ratio (performance ratio 1) of the input metric to a corrected performance ratio (performance ratio 3) of the input metric. On the other hand, the performance comparison unit 104 sets, in the case where the calculated value exceeds the benchmark performance ratio (performance ratio 1) of the output metric, a value obtained by multiplying the benchmark performance ratio (performance ratio 1) of the output metric by the reciprocal of the coefficient β of the correlation function to a corrected performance ratio (performance ratio 3) of the input metric. In this case, the performance comparison unit 104 directly sets the benchmark performance ratio (performance ratio 1) of the output metric to a corrected performance ratio (performance ratio 3) of the output metric.

For example, in the correlation model 122 in FIG. 11, the coefficient α of the correlation function for the input metric "CPU" and the output metric "DISK" of the WEB server is "0.8". Similarly, the coefficient α of the correlation function for the input metric "CPU" and the output metric "DISK" of each of the AP server and the DB server is also "0.8". Therefore, the performance comparison unit 104 sets a value obtained by multiplying the benchmark performance ratio (performance ratio 1) of the input metric "CPU" by the coefficient α, "0.8", of the correlation function to a corrected performance ratio (performance ratio 3) of the output metric "DISK", or sets a value obtained by multiplying the benchmark performance ratio (performance ratio 1) of the output metric by the reciprocal, "1/0.8", of the coefficient α of the correlation function to a corrected performance ratio (performance ratio 3) of the input metric "CPU".

As a result, in FIG. 14, the corrected performance ratio (performance ratio 3) of the metric "DISK" of the "plan A" is restricted to "0.96" obtained by multiplying the benchmark performance ratio (performance ratio 1) of the metric "CPU" by the coefficient α, "0.8". As a corrected performance ratio (performance ratio 3) of the metric "CPU", "1.2", which is the benchmark performance ratio (performance ratio 1) of the metric "CPU", is directly set. Similarly, the corrected performance ratio (performance ratio 3) of the metric "DISK" of the "plan D" is restricted to "1.2" obtained by multiplying the benchmark performance ratio (performance ratio 1) of the metric "CPU" by the coefficient α, "0.8". Furthermore, the corrected performance ratio (performance ratio 3) of the metric "CPU" of the "plan C" is restricted to "1.5" obtained by multiplying the benchmark performance ratio (performance ratio 1) of the metric "DISK" by the reciprocal of the coefficient α, "1/0.8".

Incidentally, in also the migration-source execution environment 200, in the case where processing (service) by a program of the system of a migration target is executed, the ratio of the performance ratio of the output metric to the performance ratio of the input metric of a correlation is considered to be restricted to the value of a coefficient of the correlation function. Therefore, the performance comparison unit 104 also corrects the benchmark performance ratio in the migration-source processing system that serves as a reference on the basis of the coefficient of the correlation function in the correlation model 122, and sets the corrected benchmark performance ratio as a "performance ratio 3" of the performance comparison results 124. For example, in FIG. 14, as the corrected performance ratio (performance ratio 3) of the metric "DISK" of a migration-source processing system, "0.8" obtained by multiplying the benchmark performance ratio (performance ratio 1) of the metric "CPU" by the coefficient α, "0.8" is set.

Next, in step S107 described above, the migration-destination determination unit 105 selects plans of migration-destination processing systems (VMs 320) to which the servers are to be migrated, on the basis of the "performance ratios 3" in the performance comparison results 124 and the server characteristics information 400, and presents the selected plans as a recommended plan.

Figure 15:
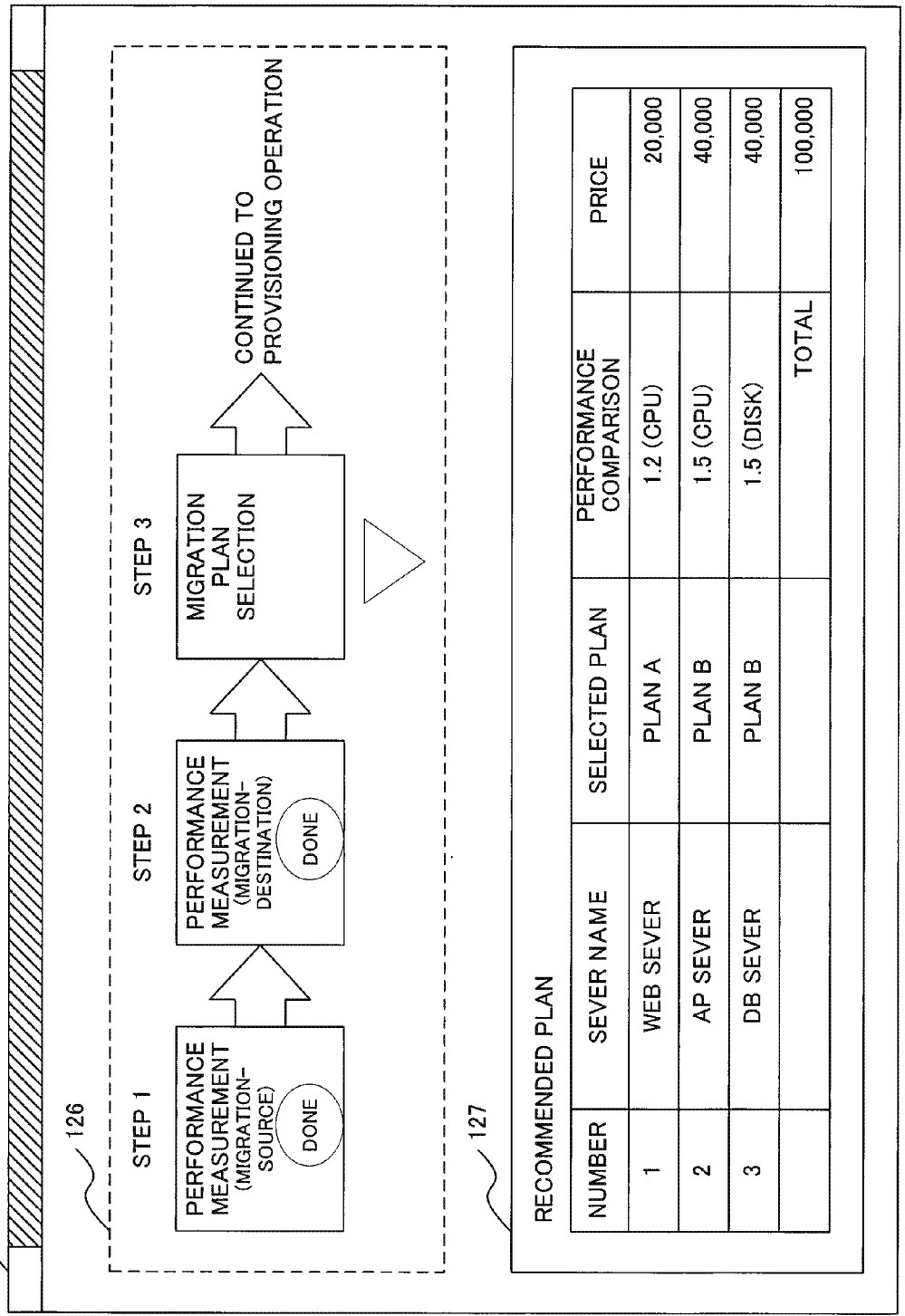
FIG. 15 is a diagram illustrating an example of a display screen 125 of a recommended plan in the second exemplary embodiment of the present invention.

FIG. 15 is a diagram illustrating an example of a display screen 125 of a recommended plan in the second exemplary embodiment of the present invention. In this case, the selected plans of the recommended plan 127 indicate the plans of migration-destination processing systems for each of the servers which have been selected on the basis of the performance ratios 3 in the performance comparison results 124 in FIG. 14 and the server characteristics information 400 in FIG. 3. Furthermore, the performance comparison indicates the metrics used for the selection and the performance ratios 3 of the metrics.

Here, with regard to the AP server, the "plan B" whose price is the cheapest in the "plan B", the "plan C" and the "plan D" in which the performance ratio 3 of the metric "CPU" is a maximum (1.5), has been selected. With regard also to the DB server, the "plan B" whose price is the cheapest in the "plan B", the "plan C" and the "plan D" in which the performance ratio 3 of the metric "DISK" is a maximum (1.2), has been selected. With regard to the WEB server, the "plan A" that is higher in the performance of the metric "CPU" than the migration-source processing system and whose price is the cheapest has been selected.

In the first exemplary embodiment of the present invention, as recommended plans for the WEB server, the AP server and the DB server, the "plan A", the "plan D" and the "plan D" have been presented, respectively, as indicated in the display screen 125 in FIG. 13, on the basis of the corrected performance ratios (performance ratios 2), and the total of the prices is 180 thousand yen. On the other hand, in the second exemplary embodiment of the present invention, the "plan A", the "plan B" and the "plan B" have been presented on the basis of the corrected performance ratios (performance ratios 3), and the total of the prices is 100 thousand yen.

Incidentally, in the case where the performance ratios 3 in the migration-source processing system have been corrected, the performance ratios 3 of the migration-destination processing systems obtained with reference to the corrected performance ratios 3 in the migration-source execution environment 200 are set for the performance comparison of the recommended plan 127. For example, in FIG. 15, for the performance comparison concerning the metric "DISK" of the "plan B" that has been selected for the DB server, "1.5", which is the ratio of the performance ratio 3 of the metric "DISK" of the "plan B", which is "1.2", to the performance ratio 3 of the metric "DISK" of the migration-source processing system, which is "0.8", has been set.

Furthermore, in the example described above, the pair of metrics having a correlation in each server is the same. The coefficient cc of the correlation functions (the input metric "CPU" and the output metric "DISK", the coefficient α of "0.8") in each server is also the same. However, in the case where the pairs of metrics having a correlation or the coefficients in each server are different, benchmark performances of metrics pursuant to the correlation of each server are collected, and the benchmark performance ratios (performance ratios 1) and the corrected performance ratios (performance ratios 3) are calculated separately for each server. In this case, a plan of a migration-destination processing system (VM 320) to which a server is to be migrated is determined on the basis of the performance ratio 3 calculated for the server.

Next, advantageous effects of the second exemplary embodiment of the present invention will be described.

According to the second exemplary embodiment of the present invention, the accuracy of the estimate of processing performance needed for the execution environment of a migration-destination can be further improved, in comparison with the first exemplary embodiment of the present invention. A reason for that is that the performance comparison unit 104 calculates, as the performance ratio, a value obtained by correcting the benchmark performance ratio on the basis of the coefficient of the correlation function in the correlation model 122.

For example, in the first exemplary embodiment of the present invention, the performance ratio (performance ratio 2) of the metric "CPU" of each of the plan B and the plan C has been restricted to "1.2", as in the performance comparison results 124 in FIG. 12. In contrast, in the second exemplary embodiment of the present invention, the performance ratio (performance ratio 3) of the metric "CPU" of each of the plan B and the plan C has been corrected to "1.5", as in the performance comparison results 124 in FIG. 14, indicating that, actually, higher performance is achieved. Furthermore, in the first exemplary embodiment of the present invention, the performance ratio (performance ratio 2) of the metric "DISK" of the migration-source processing system is "1.0". On the other hand, in the second exemplary embodiment of the present invention, the performance ratio (performance ratio 3) of the metric "DISK" of the migration-source processing system has been corrected to "0.8", indicating that, actually, the resources have not been fully used in the migration-source processing system, either.

Thus, the second exemplary embodiment of the present invention, using more accurate performance ratios, can reduce unnecessary resources and can select cheaper plans.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-233992, filed on Oct. 23, 2012, the disclosure of which is incorporated herein in its entirety by reference.

REFERENCE SIGNS LIST 100 operation management apparatus
101 performance information collection unit
102 correlation model generation unit
103 benchmark performance collection unit
104 performance comparison unit
105 migration-destination determination unit
112 correlation model storage unit
114 performance comparison result storage unit
122 correlation model
125 display screen
126 migration steps
127 recommended plan
200 migration-source execution environment
210 processing apparatus
300 migration-destination execution environment
310 processing apparatus
320 VM
400 server characteristics information
900 operation management apparatus
903 benchmark performance collection unit
904 performance comparison unit
905 migration-destination determination unit
914 performance comparison result storage unit
924 performance comparison results
925 display screen
926 migration steps
927 recommended plan

What is claimed is:
1. An operation management apparatus comprising:
hardware, including a processor, memory, and a physical storage device, a correlation model storage unit implemented at least by the physical storage device and which stores a correlation model indicating a correlation for each pair of different metrics in a state of executing a predetermined program in a first processing system, the correlation indicating a relationship between a pair of time series data of the different metrics;
a benchmark performance collection unit implemented at least by the processor and the memory and which selects a metric having a correlation with another metric in the correlation model in a state of executing a predetermined benchmark process in the first processing system and a second processing system, respectively, and collects values of the selected metric;
a performance comparison unit implemented at least by the processor and the memory and which calculates and outputs a performance ratio of a metric in the second processing system to the metric in the first processing system, based on the values of the selected metrics in the state of executing the predetermined benchmark process in the first processing system and the second processing system, respectively; and wherein the performance comparison unit corrects, with respect to the pair of metrics having the correlation in the correlation model, a benchmark performance ratio so that a ratio of the benchmark performance ratio of a metric to the benchmark performance ratio of the other metric is equal to a value of a coefficient of a correlation function that represents the correlation and a value of the benchmark performance ratio after the correction is equal to or smaller than a value of the benchmark performance ratio before the correction.

2. The operation management apparatus according to claim 1, wherein the performance comparison unit calculates, as the performance ratio, a benchmark performance ratio that is a ratio of a value of a metric in the state of executing the predetermined benchmark process in the second processing system to a value of the metric in the state of executing the predetermined benchmark process in the first processing system.

3. The operation management apparatus according to claim 2, wherein the performance comparison unit calculates, as the performance ratio, a value obtained by correcting the benchmark performance ratio based on the correlation in the correlation model.

4. The operation management apparatus according to claim 3, wherein the performance comparison unit corrects the benchmark performance ratio by setting, with respect to a pair of metrics having a correlation in the correlation model, the benchmark performance ratio of a metric whose benchmark performance ratio is small to the benchmark performance ratio of the other metric whose benchmark performance ratio is large.

5. The operation management apparatus according to claim 1, further comprising a migration-destination determination unit implemented at least by the processor and the memory and which determines the second processing system to be a migration-destination of the predetermined program process based on the performance ratio of the metric in the second processing system to the metric in the first processing system.

6. An operation management method comprising:
storing a correlation model indicating a correlation for each pair of different metrics in a state of executing a predetermined program in a first processing system, the correlation indicating a relationship between a pair of time series data of the different metrics;
selecting values of a metric having a correlation with another metric in the correlation model in a state of executing a predetermined benchmark process in the first processing system and a second processing system, respectively, and collecting values of the selected metric;
calculating and outputting a performance ratio of a metric in the second processing system to the metric in the first processing system, based on the values of the selected metrics in the state of executing the predetermined benchmark process in the first processing system and the second processing system, respectively; and
wherein correcting, with respect to a pair of metrics having a correlation in the correlation model, the benchmark performance ratio so that a ratio of the benchmark performance ratio of a metric to the benchmark performance ratio of the other metric is equal to a value of a coefficient of a correlation function that represents the correlation and a value of the benchmark performance ratio after the correction is equal to or smaller than a value of the benchmark performance ratio before the correction.

7. The operation management method according to claim 6, wherein, the calculating calculates, as the performance ratio, a benchmark performance ratio that is a ratio of a value of a metric in the state of executing the predetermined benchmark process in the second processing system to a value of the metric in the state of executing the predetermined benchmark process in the first processing system.

8. The operation management method according to claim 7, wherein the calculating calculates, as the performance ratio, a value obtained by correcting the benchmark performance ratio based on the correlation in the correlation model.

9. The operation management method according to claim 8, wherein the correcting corrects the benchmark performance ratio by setting, with respect to a pair of metrics having a correlation in the correlation model, the benchmark performance ratio of a metric whose benchmark performance ratio is small to the benchmark performance ratio of the other metric whose benchmark performance ratio is large.

10. The operation management method according to claim 6, further comprising determining the second processing system to be a migration-destination of the predetermined program process based on the performance ratio of the metric in the second processing system to the metric in the first processing system.

11. A non-transitory computer readable storage medium recording thereon a program, causing a computer to perform a method comprising:
storing a correlation model indicating a correlation for each pair of different metrics in a state of executing a predetermined program in a first processing system, the correlation indicating a relationship between a pair of time series data of the different metrics;
selecting a metric having a correlation with another metric in the correlation model in a state of executing a predetermined benchmark process in the first processing system and a second processing system, respectively, and collecting values of the selected metric;
calculating and outputting a performance ratio of a metric in the second processing system to the metric in the first processing system, based on the values of the selected metrics in the state of executing the predetermined benchmark process in the first processing system and the second processing system, respectively; and
wherein correcting, with respect to pair of metrics having a correlation in the correlation model, the benchmark performance ratio so that a ratio of the benchmark performance ratio of a metric to the benchmark performance ratio of the other metric is equal to a value of a coefficient of a correlation function that represents the correlation and a value of the benchmark performance ratio after the correction is equal to or smaller than a value of the benchmark performance ratio before the correction.

12. The non-transitory computer readable storage medium recording thereon the program according to claim 11, causing a computer to perform the method, wherein, the calculating calculates, as the performance ratio, a benchmark performance ratio that is a ratio of a value of a metric in the state of executing the predetermined benchmark process in the second processing system to a value of the metric in the state of executing the predetermined benchmark process in the first processing system.

13. The non-transitory computer readable storage medium recording thereon the program according to claim 12, causing a computer to perform the method, wherein the calculating calculates, as the performance ratio, a value obtained by correcting the benchmark performance ratio based on the correlation in the correlation model.

14. The non-transitory computer readable storage medium recording thereon the program according to claim 13, causing a computer to perform the method, wherein the correcting corrects the benchmark performance ratio by setting, with respect to a pair of metrics having a correlation in the correlation model, the benchmark performance ratio of a metric whose benchmark performance ratio is small to the benchmark performance ratio of the other metric whose benchmark performance ratio is large.

15. The non-transitory computer readable storage medium recording thereon the program according to claim 11, causing a computer to perform the method, further comprising determining the second processing system to be a migration-destination of the predetermined program process based on the performance ratio of the metric in the second processing system to the metric in the first processing system.

16. An operation management apparatus comprising:
 a correlation model storage means for storing a correlation model indicating a correlation for each pair of different metrics in a state of executing a predetermined program in a first processing system, the correlation indicating a relationship between a pair of time series data of the different metrics;
 a benchmark performance collection means for selecting a metric having a correlation with another metric in the correlation model in a state of executing a predetermined benchmark process in the first processing system and a second processing system, respectively, and collecting values of the selected metric;
 a performance comparison means for calculating and outputting a performance ratio of a metric in the second processing system to the metric in the first processing system, based on the values of the selected metrics in the state of executing the predetermined benchmark process in the first processing system and the second processing system, respectively; and
 wherein the performance comparison means for corrects, with respect to the pair of metrics haven the correlation in the correlation model, a benchmark performance ratio so that a ratio of the benchmark performance ratio of a metric to the benchmark performance ratio of the other metric is equal to a value of a coefficient of a correlation function that represents the correlation and a value of the benchmark performance ratio after the correction is equal to or smaller than a value of the benchmark performance ratio before the correction.

* * * * *